Figure 1:
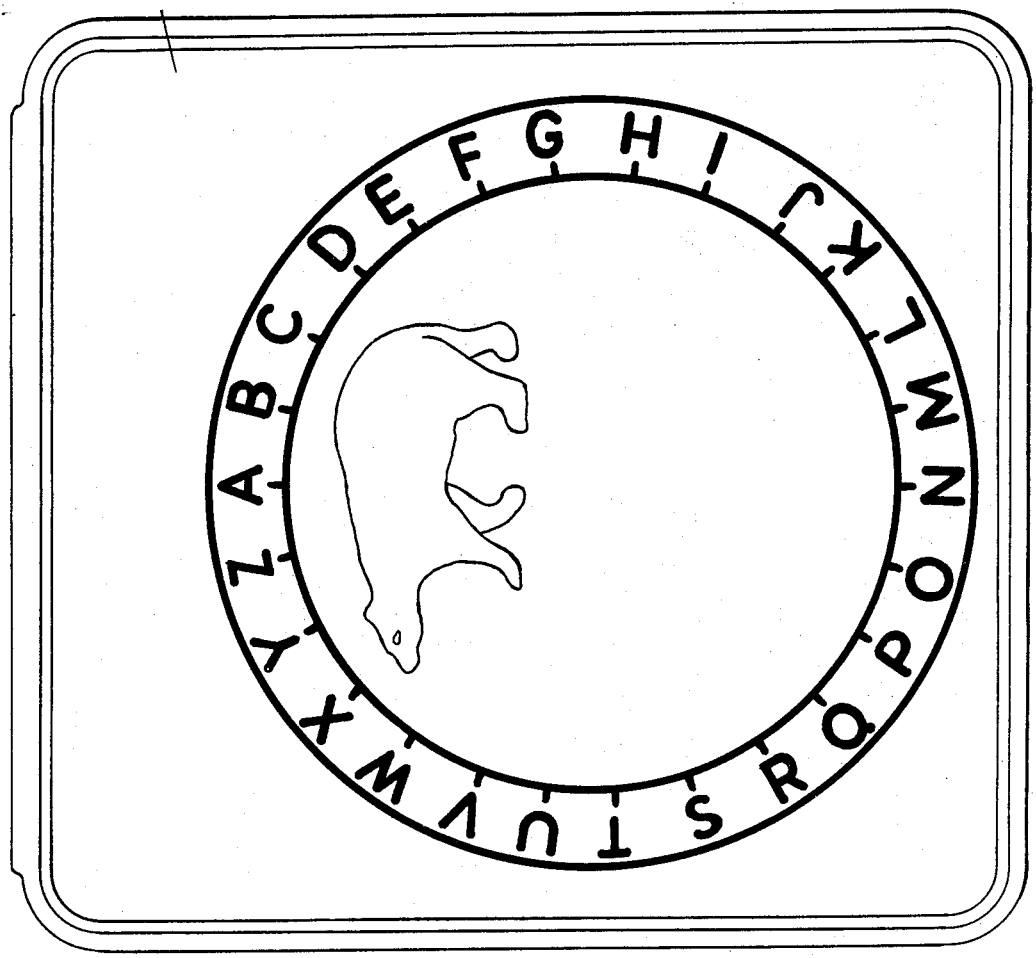

United States Patent
Mabbutt

[15] 3,696,529
[45] Oct. 10, 1972

[54] DRAWING AND TEACHING MACHINE

[72] Inventor: David Robert Mabbutt, London, England

[73] Assignee: Rotadraw Limited, London, England

[22] Filed: Feb. 11, 1971

[21] Appl. No.: 114,418

[30] Foreign Application Priority Data

April 30, 1970 Great Britain..........20,847/70

[52] U.S. Cl. .............................35/26, 35/35 F, 35/74, 33/174 B
[51] Int. Cl. ...............................................B43l 13/20
[58] Field of Search ........35/26, 37, 27, 74; 273/157; 283/45; 33/174 B

[56] References Cited

UNITED STATES PATENTS

| 557,895 | 4/1896 | Saunders | 273/157 |
| 1,552,406 | 9/1925 | Akerbladh | 35/26 |
| 2,570,806 | 10/1951 | Henry | 35/26 |

FOREIGN PATENTS OR APPLICATIONS

| 559,335 | 4/1960 | Belgium | 35/74 |

Primary Examiner—Harland S. Skogquist
Attorney—Irving M. Weiner

[57] ABSTRACT

A drawing or teaching apparatus for drawing an object including a circular disc having a reference mark and a plurality of apertures and/or slots hereafter referred to as apertures, each aperture having an alphabetical letter associated therewith, these alphabetical letters together forming the name of the object, and a frame having a recess or aperture adapted to receive the disc so that the disc can rotate therein, the frame having at least a plurality of stationary alphabetical letters corresponding to the first said alphabetical letters located at different positions around the periphery of the recess or aperture in the frame so that by rotating the disc in the frame successively into angular positions where the reference mark is adjacent each of the stationary alphabetical letters on the frame which correspond to an alphabetical letter associated with an aperture in the disc and tracing along the contour of the corresponding aperture, a representation of the object is drawn.

4 Claims, 2 Drawing Figures

PATENTED OCT 10 1972

3,696,529

INVENTOR
DAVID ROBERT MABBUTT
BY *Irving M. Weiner*
ATTORNEY

DRAWING AND TEACHING MACHINE

This invention includes a drawing machine including a first member having a reference mark and a number of cut-out apertures and/or slots hereafter referred to as apertures, each aperture having an alphabetical letter, a second member having an aperture adapted to receive the first member so that the first member can rotate therein, the second member having different alphabetical letters located as positions around the periphery of the aperture.

The invention also includes a method of drawing an object including the steps of rotating a first member in a second member until a reference mark on the first member is adjacent the first alphabetical letter of the name of the object, tracing along an aperture in the first member associated with that alphabetical letter and repeating these two steps for each alphabetical letter of the name of the object.

Figure 2:
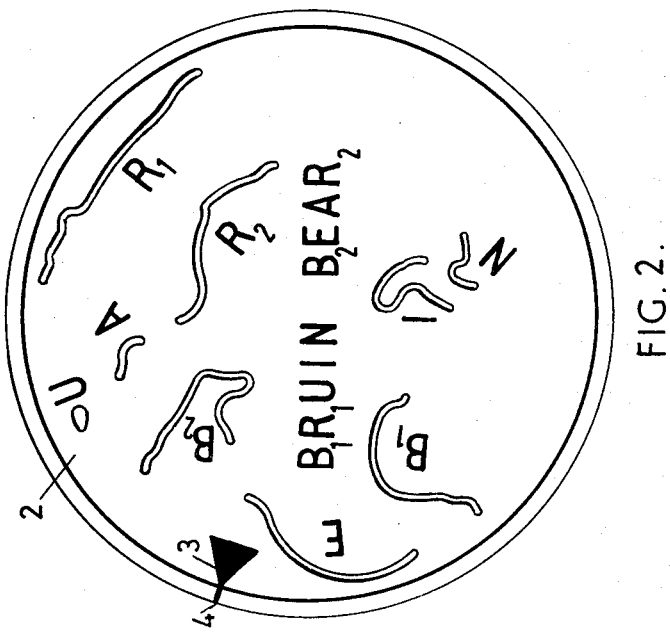

The machine can be used as a teaching machine or a toy for children. An embodiment is shown in the accompanying drawings in which:

FIG. 1 shows a hinged frame and
FIG. 2 shows a disc for insertion into the frame.

In FIG. 1 there is a frame having an upper panel 1 hingedly or pivotally connected along one side to a lower panel (not shown) and having a circular aperture having the letters of the alphabet spaced around near the periphery. A sheet of paper can be located between the upper and lower panels and several disc members 2 are provided and one of these members 2 is inserted in the aperture. This member 2 has a series of apertures or slots of different shaped and lengths and each apertures has an alphabetical letter associated therewith. The member 2 can have a depression or other engagement means for the finger of the operator to rotate or otherwise move the member 2 if found necessary so that a reference mark or pointer 3 on member 2 can be brought adjacent each letter of the alphabet provided on panel 1 around the periphery of its aperture.

Each disc member is designed to draw one particular object, for example a butterfly. The operator turns the disc 2 until mark 4 a radial extension of pointer numeral 3 is adjacent B on panel 1 and then traces with a pen or pencil along the slot associated with B on disc 2. The operator then turns mark 4 to R and traces along the slot R. Since there are two R's in "BRUIN BEAR" they are distinguished as R1 and R2. When all the letters of the word BRUIN BEAR have been accounted for the disc 2 is removed and a picture of a bear is shown on the paper below. Clearly a spelling error by the operator will be revealed as an error in the drawings.

It has been considered most suitable if the slots or apertures are designed so that a correct complete drawing will be achieved if the operator traces or draws each slot when the pointer 3 is correctly aligned with the associated alphabetical letter on the surrounding panel 1 whatever sequence the operator performs with the various letters of the constituent name.

I claim:

1. A drawing of teaching apparatus including a first member having a reference mark and a plurality of apertures, each aperture having an alphabetical letter associated therewith, these alphabetical letters together forming the name of an object, a second member having a recess adapted to receive the first member so that the first member can rotate therein, the second member having at least a plurality of stationary alphabetical letters corresponding to the first said alphabetical letters located at different positions around the periphery of the recess in the second member so that by rotating the first member in the second member successively into angular positions where the reference mark is adjacent each of the stationary alphabetical letters on the second member which correspond to an alphabetical letter associated with an aperture in the first member and tracing along the contour of the corresponding aperture, a representation of the object is drawn.

2. Apparatus as claimed in claim 1 wherein some of the apertures in the first member have the same alphabetical letter associated therewith, these same alphabetical letters having different reference numerals associated therewith to indicate the plurality of occurrences of that letter occurring in the name of the object.

3. Apparatus as claimed in claim 1 wherein the second member includes a first panel having an aperture and a second panel pivotally connected to the first panel and arranged to provide a flat support surface for supporting paper directly below the aperture.

4. Apparatus as claimed in claim 1 wherein the first member has engagement means for the operator to engage and move the first member.

* * * * *